United States Patent
Baginski

[15] 3,701,291
[45] Oct. 31, 1972

[54] BICYCLE PEDAL HAVING LUMINOUS PORTIONS THEREON

[72] Inventor: Martin R. Baginski, Austinberg Twsp, Ashtabula, Ohio

[73] Assignee: Ashtabula Bow Socket Company, Ashtabula, Ohio

[22] Filed: May 6, 1971

[21] Appl. No.: 141,024

Related U.S. Application Data

[63] Continuation of Ser. No. 795,948, Feb. 3, 1969, abandoned.

[52] U.S. Cl. ................................................ 74/594.4
[51] Int. Cl. ............................................... G05g 1/14
[58] Field of Search ....... 74/594.4, 594.1, 560; 90/14

[56] References Cited

UNITED STATES PATENTS

| | | | |
|---|---|---|---|
| 3,186,254 | 6/1965 | Golden et al. | 74/594.4 |
| 2,151,144 | 3/1939 | Penny et al. | 74/594.4 |
| 1,567,775 | 12/1925 | Wagner | 74/594.4 |
| 2,897,687 | 8/1959 | Douglas et al. | 74/594.4 |
| 3,127,789 | 4/1964 | Van De Loo | 74/594.4 |
| 3,302,483 | 2/1967 | Golden et al. | 74/594.4 |

FOREIGN PATENTS OR APPLICATIONS

| | | | |
|---|---|---|---|
| 1,207,295 | 2/1960 | France | 74/594.4 |
| 105,066 | 7/1942 | Sweden | 74/594.4 |
| 908,706 | 4/1954 | Germany | 74/594.4 |

*Primary Examiner*—William F. O'Dea
*Assistant Examiner*—F. D. Shoemaker
*Attorney*—Yount and Tarolli

[57] ABSTRACT

An improved bicycle pedal includes a pedal body with upper and lower sides adapted to be engaged by a rider's foot and luminescent outer sides adjacent to the upper and lower sides. To render the bicycle pedal luminous such that a cyclist's presence on the bicycle will be indicated, the outer sides have a luminescent paint supported thereon. The luminescent paint is supported on the pedal body in a manner such that no special attaching means formed as a part of the pedal body is necessary.

4 Claims, 10 Drawing Figures

INVENTOR.
MARTIN R. BAGINSKI
BY
Yount, Flynn & Tarolli
ATTORNEYS

PATENTED OCT 31 1972 3,701,291

INVENTOR.
MARTIN R. BAGINSKI
BY
Yount, Flynn & Tarolli
ATTORNEYS

BICYCLE PEDAL HAVING LUMINOUS PORTIONS THEREON

This application is a continuation of application Ser. No. 795,948, filed Feb. 3, 1969 now abandoned.

The present invention relates to a safety bicycle pedal which is rendered luminous by a luminescent paint applied to the pedal, and in particular, the present invention relates to a bicycle pedal having a pedal body with upper and lower sides adapted to be engaged by a rider's foot and outer sides adjacent to the upper and lower sides on which the luminescent paint is supported.

Safety bicycle pedals having separate reflectors mounted on the pedal body by attaching means formed as part of the pedal body are known. Such safety pedals have incorporated many different attaching devices to retain the separate reflector on the pedal body. These pedal reflectors of the prior art have included such separate reflectors as injection molded reflectors having facets on one side to reflect the light and include a warning color such as amber or red. But these separate reflectors are extremely expensive to manufacture due to the reflector material, mold and manufacturing costs. In addition, every time the shape or form of the reflector is changed a new mold is required.

The attaching means formed as part of the pedal body as required by the prior art also represents additional costs and requires a significant investment when the reflector form is changed. Furthermore, these reflector pedals of the prior art are structurally complex and extremely expensive to manufacture since additional complex operations are required to assemble these separate parts into one pedal.

The bicycle pedal of the present invention eliminates the need for separate reflectors and their complimentary attaching devices formed as part of the pedal body by providing a luminescent paint on the outer side of a bicycle pedal. Thus, such a safety pedal may be manufactured at less expense with greater design versatility of the luminescent form.

This advantageous design provides a bicycle pedal which will clearly indicate a cyclist's presence. For example, if a motorist is approaching a cyclist utilizing the pedals of the immediate invention, his head lights will strike the luminescent paint and he will see a flashing signal due to the motion of the pedals. The color of the paint will act to enhance the warning nature of the flashing signal and may be any of a number of colors.

Accordingly, it is an object of this invention to provide a new and improved luminescent bicycle pedal which is constructed so as to eliminate the need for any separate reflectors and attaching devices formed as part of the pedal body which retain the separate reflectors thereon.

It is another object of this invention to render a bicycle pedal luminescent by applying luminescent paint to an outer side thereof adjacent to the upper and lower sides of the pedal which are adapted to be engaged by a rider's foot.

It is yet another object of this invention to render a bicycle pedal luminous by applying luminescent paint to the outer sides of a bicycle pedal such that the luminescent paint is supported on the outer sides by the cohesive adhesion of the luminescent paint to the pedal body.

It is yet a further object of this invention to provide a bicycle pedal having an indentation in its outer sides which is adapted to receive luminescent paint and to restrain the lateral flow of the luminescent paint during application of the luminescent paint to the pedal body.

It is a more specific object of this invention to provide a pedal tread having an indentation therein adapted to receive luminescent paint for restraining the lateral flow of the luminescent paint during application of the luminescent paint to the pedal body such that a predetermined form is rendered luminescent.

Still further objects, advantages and features of the present invention will be apparent to those skilled in the art to which it relates from the following detailed description made with reference to the accompanying drawings forming a part of the specification and in which.

The present invention provides a bicycle pedal which is rendered luminescent by a luminescent paint applied thereon. A bicycle pedal of the present invention includes a pedal body with an upper and a lower side adapted to be engaged by a rider's foot and outer sides positioned adjacent to and interposed between the upper and lower sides with luminescent paint supported on the outer sides. When a bicycle pedal is rendered luminous in this manner, a clear indication of a cyclist's presence on a bicycle having such pedals will be provided.

Figure 1:
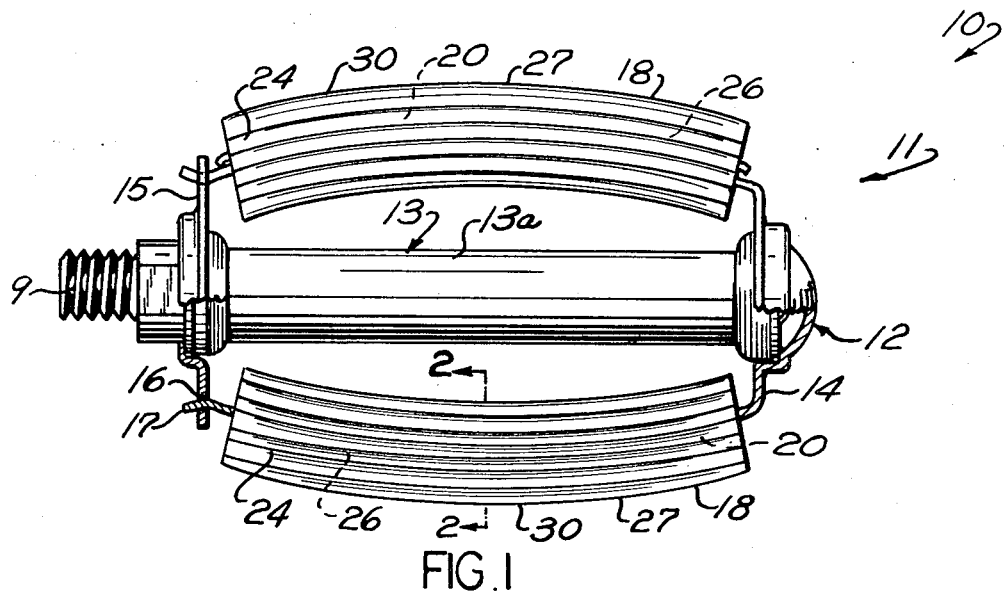
FIG. 1 is a plan view of a bicycle pedal embodying the present invention.

FIG. 1 shows a representative bicycle pedal 10 embodying the present invention. The pedal 10 includes a pedal body 11 rotatably mounted on an axle 9. The pedal construction shown in FIG. 1 includes a tread support means 12 and an inner assembly 13. The inner assembly 13 includes a tube 13a which is rotatably mounted on the axle 9 in any conventional manner.

The tread support means 12 includes a bow strap 14 and a stud end brace 15. The bow strap 14 includes side members 20 which have nibs 17 on the inboard ends thereof. The stud end brace 15 has apertures 16 adapted to receive respective nibs 17. Tread members 18 may be provided to be slideably engaged by the bow strap 14 such that they define an upper surface 24 and lower surface 26 to be engaged by a bicycle rider's foot.

These upper and lower surfaces 24 and 26 respectively may have any one of a number of geometric configurations for providing an anti-slip surface thereon. It should be noted that the treads 18 may be manufactured from any material such as a natural or synthetic rubber or plastic.

The pedal body 11 may be assembled by sliding the tread means 18 onto the bow strap 14, inserting the nibs 17 of the bow strap 14 into the apertures 16 of the stud end brace 15 with the inner assembly 13 positioned between the bow strap 14 and stud end brace 15. By urging the stud end brace toward the bow strap 14 such that the nibs 17 are received by the apertures 16, the stud end brace 15 and bow strap 14 frictionally engage the inner assembly 13 to form an integral pedal body 11. The pedal body 11 is maintained as an integral part by crimping the nibs 17. Thus, the pedal body 11 consists of the bow strap 14 having treads 18 thereon, a stud end brace 15 and an inner assembly 13 such that the pedal body 11 is rotatably mounted on the axle 9.

Adjacent to the upper and lower sides, 24 and 26 respectively, are outer sides 27 of the pedal body 11. The outer sides 27 may be defined by the tread 18 or the tread supporting means 12 or a combination of the two. The outer sides 27 may otherwise be defined as a side of the pedal body 11 adjacent to and interposed between the upper and lower surfaces 24 and 26, respectively, of the pedal body 11.

The outer sides 27 of the pedal body 11 are adapted to receive luminescent paint 30 to render the pedal visible at night. Since the upper and lower surfaces 26 and 24 may be engaged by the foot of a cyclist, the pedal will be oriented such that one of the outer sides 27 will be visible to one viewing the bicycle from the front of the bicycle or to one viewing the bicycle from the rear. It is apparent that if the outer sides 27 are so painted that no matter which operational direction the pedal is oriented in, it will be visible in either the forward or rearward direction such that a warning signal will be exhibited thereby.

Figure 3:
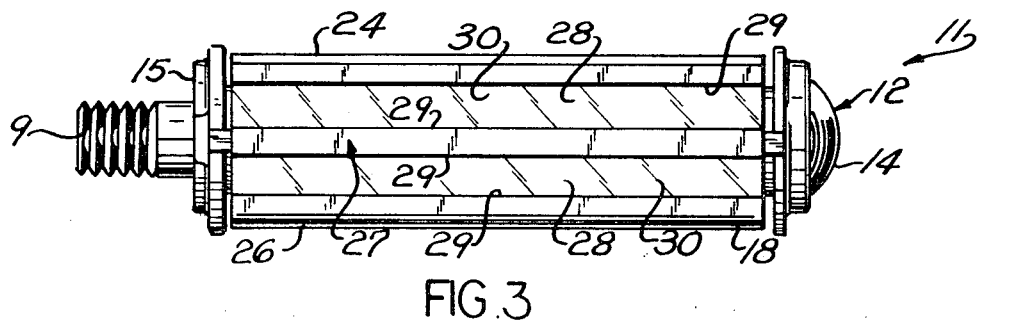
FIG. 3 is a side elevational view of the pedal shown in FIG. 1.

Each of the outer sides 27 of the pedal are of similar form and only one will be described. As illustrated in FIG. 3, the outer side 27, shown therein, has an indentation 28 adapted to receive a luminescent paint 30 applied therein. The paint is retained on the tread 18 by the cohesive adhesion of the paint. The indentations 28 have side walls 29 to define the form of the paint applied thereto. These indentations 28 may have any shape desired to enhance the aesthetic design of the luminescent pedal of the present invention. Since the form of the indentation 28 may be varied during the manufacture of the tread 18, full advantage of this feature may be taken without a great increase in cost. It should be apparent that when a bicycle rider is utilizing a luminescent pedal of the immediate invention that one outer side 27 will be visible forwardly and another rearwardly.

Figure 10:
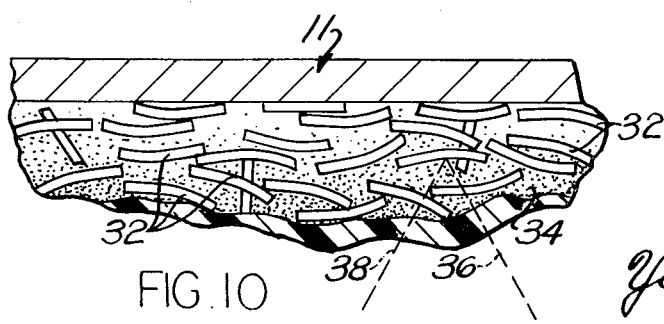
FIG. 10 is a cross-sectional of luminescent paint on a pedal body taken along line 10—10 of FIG. 4.

The luminescent paint 30 may include any one of a number of bases. For example, acrylic latex, acrylic, silicone rubber or vinyl base. One such luminescent paint is produced and sold in many colors by Metalflake, Inc. under the trademark "Metalflake" and which will be referred to hereinafter as Metalflake for the sake of convenience. This paint has metal flakes 32 as best seen in FIG. 10 interspersed in the base 34. These metal flakes 32 serve to act as a number of reflective surfaces to create a signal indicating a cyclist's presence.

It should be apparent to one skilled in the art that the luminescent paint 30 may include any paint which reflects light, for example, the Metalflake paint described above, or gives off light, for example, a phosphorescent paint. The use of a luminescent paint on a bicycle pedal that absorbs light and subsequently gives it off, such as phosphorescent paint, further enhances the warning signal by prolonging the period of the warning signal.

Figure 2:
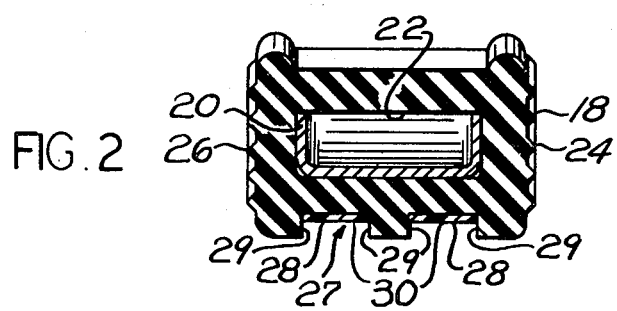
FIG. 2 is a fragmentary sectional view showing the pedal tread of the pedal of FIG. 1 in cross-section and taken through line 2—2 of FIG. 1.

The luminescent paint 30 may be applied to the indentations 28 by any conventional painting method such as flowing or spraying. When the luminescent paint 30 in its liquid form is applied to the outer side 27, the side walls 29 of indentations 28 restrain the luminescent paint 30 from lateral flow out of the indentation 28 such that a clearly defined form is produced. As shown in FIGS. 2 and 3, the form may include two grooves running the length of the outer side 27 of the pedal 10.

If the indentations 28 were not so provided, the paint would be applied to the pedal in an irregular fashion such that uniform reflective properties of the luminescent paint 30 would not be provided. More specifically, by providing the indentations 28, the luminescent paint 30 assumes a uniform and determinable depth which eliminates high and low thicknesses in the luminescent paint and thus issues uniform reflective properties.

For example, if a Metalflake paint were used, the metal flakes 32 contained in such a luminescent paint would be provided in a uniform quantity and depth which would maximize the luminescent properties of such a paint. The metal flakes 32 included in such luminescent paint do not orient themselves in any particular fashion, but rather are arranged in a haphazard manner such that the light rays 36, when striking the luminescent paint, reflect in a manner similar to conventional faceted reflectors, for example along line 38. To provide coloration of the reflected rays 38, the base 34 of such a luminescent paint may include different color pigments. An optional additional series of clear top coats may be provided to further maximize these luminescent properties.

It should be apparent from the above, that when the luminescent paint 30 is applied to the pedal body 11, the luminescent paint 30 comes in cohesive adhesion with the pedal body 11 when the paint dries. This cohesive adhesion retains the paint on the pedal body 11. As a result, no attaching means formed as part of the pedal body is required to retain the luminescent paint 30 to the pedal body 11. This is a substantial improvement over the prior art which requires separate attaching means as part of the pedal body to hold a separate reflector on the pedal body. The use of luminescent tape having an adhesive backing may also be used as opposed to directly applying the paint to the pedal body. Such also would not require separate attaching means formed as part of the pedal body.

The specific pedal body construction shown in FIG. 1 should be considered as primarily illustrative. The invention is applicable to various different structures obvious to those skilled in the art, such as pedals constructed with an integral one-piece tread and tread support means. Other constructions are illustrated in the drawings in FIGS. 4-9. For ease of description, these other constructions are numbered with numerals the same as those used in FIG. 1 to denote common parts where appropriate and followed by a suffix letter to denote each specific embodiment. For example, the common parts of the construction shown in FIGS. 4 and 5 will be followed by the suffix "a," the common parts in FIGS. 6 and 7 by the suffix "b," and the common parts in FIGS. 8 and 9 by the suffix "c."

Figure 4:
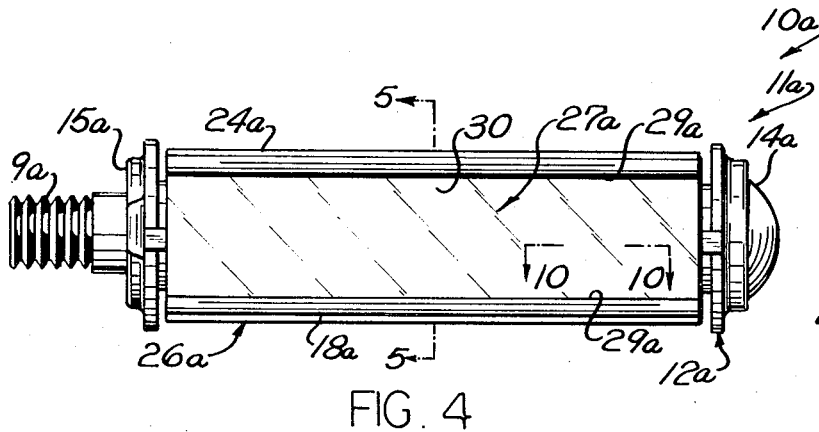
FIG. 4 is a side elevational view of a pedal similar to that shown in FIG. 1, but of modified construction.
Figure 5:
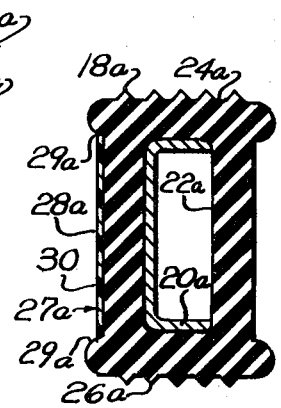
FIG. 5 is a fragmentary sectional view of the pedal of FIG. 4 and taken along line 5—5 of FIG. 4.

As shown in FIGS. 4 and 5, the illustrated embodiment includes a tread 18a which has an aperture 22a adapted to receive the side member 20a of tread support means 12a. The tread 18a thus becomes a part of the pedal body 11a when mounted on the side member 20a. Tread 18a has an upper surface 24a and lower surface 26a adapted to engage the bicycle rider's foot. These upper and lower surfaces 24a and 26a respectively may be any one of a number of configurations for providing an anti-slip surface thereon. Adjacent to the upper surface 24a and the lower surface 26a, is an outer surface 27a which is visible when the pedal is viewed from the outer side as shown in FIG. 5.

This outer side 27a has indentation 28a adapted to receive a luminescent paint 30 applied therein and retain it by the cohesive adhesion of the paint to the pedal body 11a. The indentations 28a have side walls 29a to define the form of the indentation 28a. The indentations 28a may have any shape desired to enhance the aesthetic design of the luminescent pedal of the present invention. Since the form of the indentation 28a may be varied during the manufacture of the tread 18a, full advantage of this feature may be taken without a great increase in cost. It should be apparent that when a bicycle rider is utilizing a luminescent pedal of the immediate invention that one outer side 27b will be visible forwardly and another rearwardly of the bicycle.

The luminescent paint 30 may be applied to the indentation 28a by any conventional painting method, such as flowing or spraying. When the luminescent paint 30 in its liquid form is applied to the outer side 27a, the side walls 29a of indentations 28a restrain the luminescent paint 30 from lateral flow out of the indentation 28a such that a clearly defined form is produced. As shown in FIG. 4, the form may include one groove running the length of the outer side 27a of the pedal 10a.

It should be understood that the alternative cross-sectional configuration of the tread shown in FIGS. 4 and 5 has similar cross-sectional characteristics to that shown in FIGS. 2 and 3 with the exception that an indentation 28a defining a wide stripe is provided in the tread instead of a plurality of stripes 28. In some particular instances, the broad stripe is more functional than the plurality of stripes since a greater surface of luminescent paint is provided as opposed to the design versatility of a plurality of stripes which may have a number of different luminescent paints therein.

Figure 6:
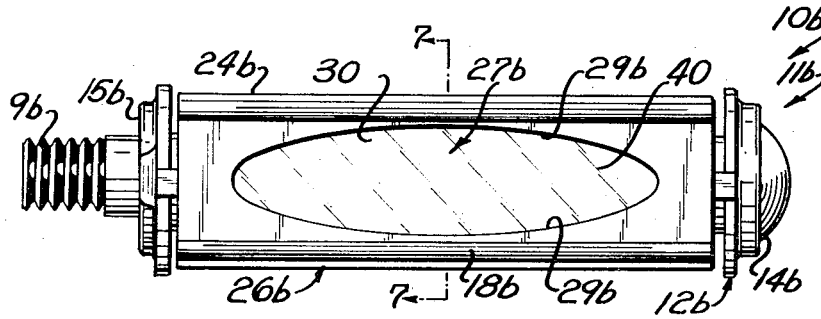
FIG. 6 is a side elevational view of another pedal similar to that shown in FIG. 1, but of a modified construction.
Figure 7:
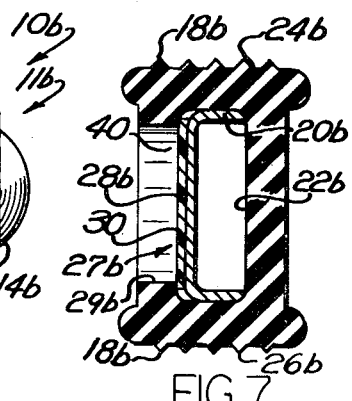
FIG. 7 is a fragmentary sectional view of the pedal of FIG. 6 taken along line 7—7 of FIG. 6.

FIGS. 6 and 7 show a third embodiment of the immediate invention wherein the side member 20b and the tread 18b define the outer side 27b. The tread 18b has an aperture 22b adapted to receive the side member 20b of tread support means 12b such that the tread 18b will become a part of the pedal body 11b.

Tread 18b has an upper surface 24b and a lower surface 26b adapted to be engaged by the bicycle rider's foot. These upper and lower surfaces 24b and 26b, respectively may have any one of a number of configurations for providing an anti-slip surface thereon. Adjacent to the upper surface 24b and the lower surface 26b is an outer side 27b which is visible when the pedal 10 is viewed from the outer side 27b as shown in FIG. 7.

The visible outer side 27b is partially defined by the tread 18b and partially defined by the tread support means 12b and more specifically the side member 20b of bow strap 14b. Luminescent paint 30 is applied to the tread support means 12b. After the luminescent paint 30 adheres to the tread support means 12b, the tread 18b is slideably positioned thereon. The tread 18b includes visible form defining means 40 such as an aperture which allows the luminescent paint 30 on the side member 20b to be seen when viewing the outer side 27b. The aperture may have any shape desired and may be provided by many manufacturing techniques such as by die cutting the shape in the tread 10b or by forming the aperture during the manufacture of the tread. As is readily apparent, the shape of the visible form defining means 40 may be changed from one shape to another at a minimum of effort.

Figure 8:
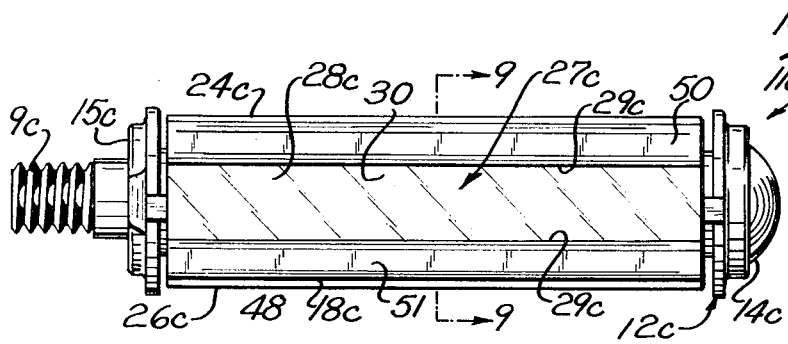
FIG. 8 is a side elevational view of a pedal similar to that shown in FIG. 1, but of a modified construction.
Figure 9:
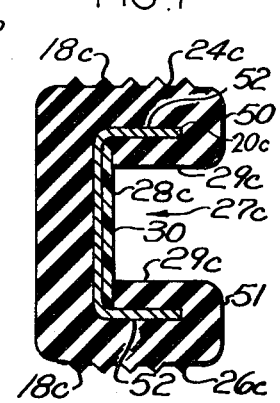
FIG. 9 is a fragmentary sectional view of the pedal of FIG. 8 and taken along line 9—9 of FIG. 8.

FIGS. 8 and 9 show a fourth embodiment of the immediate invention. The tread member 18c has an upper surface 24c and a lower surface 26c adapted to be engaged by the foot of a cyclist and outer side portions 50 and 51 which define a portion of the outer side 27c of the pedal 10c. The tread-supporting means 12c comprises a side member 20c which includes tread bearing flanges 52 which form an indentation 28c by side walls 29c to receive a luminescent paint 30 and provide a bearing surface for the tread 18c. Tread 18c is shown in FIG. 8 having a geometric configuration which is adapted to receive the side members 20c without extending entirely around the side member 20c. The luminescent paint 30 is applied to the side member 20c prior to assembly with the tread 18c. The indentation 28c serves to restrain the lateral flow and to provide a uniform coating of the luminescent paint in order to maximize the luminescent properties of the luminescent paint 30.

It should be noted that in some cases the side member 20b or 20c may be plated prior to assembly with a bright material such as zinc or chrome to further enhance the luminescent properties of the luminescent paint 30 by reflecting any light rays that might pass around the metal flakes.

After the coating is applied to the side member 20c, the tread 18c is slideably engaged with the side member 20c and defines the shape of the luminescent form when viewed on the side 27c of the pedal 10c. It should be apparent that the tread member need not form a portion of the outer side 27c or even be present to provide a pedal having a luminescent coating on the outer side 27c of the immediate invention.

It should be apparent from the above that the present invention provides a new and improved bicycle pedal having a pedal body with upper and lower sides adapted to be engaged by a rider's foot and including outer sides adjacent to the upper and lower sides having luminescent paint adhered to the outer sides for rendering the bicycle pedal luminescent to provide an indication of a cyclist's presence.

What is claimed is:

1. A bicycle pedal having a pedal body with upper and lower sides adapted to be engaged by a rider's foot, said pedal body having outer sides adjacent to said upper and lower sides, said pedal body including tread-supporting means, at least one tread supported by said tread supporting means and means on at least one of said tread-supporting means and said tread for rendering the bicycle pedal luminous, said means comprising luminescent paint adhered to said tread-supporting means and said tread for producing a visible signal upon light impinging thereon, one of said tread means and said tread-supporting means having a form-defining means adapted to define the form of the luminescent paint on the other of said tread means and tread-supporting means.

2. A bicycle pedal as defined in claim 1 wherein the other of said tread means and said tread-supporting means includes at least one indentation therein for receiving said luminescent paint which comprises said form-defining means.

3. A bicycle pedal having a pedal body with upper and lower sides adapted to be engaged by a bicycle rider's foot, said pedal body having outer sides adjacent to said upper and lower sides, said pedal body including a tread-supporting means and tread means mounted on said tread-supporting means, said tread means having means providing for visibility of said tread-supporting means, luminescent paint supported on each of the outer sides of said tread-supporting means, said means providing visibility comprising an aperture in said pedal tread such that said luminescent paint on said tread-supporting means renders the pedal luminescent.

4. A bicycle pedal having a pedal body with upper and lower sides adapted to be engaged by a rider's foot, said pedal body having outer sides adjacent to said upper and said lower sides and an inboard and an outboard end, a pedal axle rotatably received by said pedal body, a tread-supporting means, at least one tread supported by said tread-supporting means, said tread-supporting means including a first frame member having an outboard portion extending along the outboard end of said pedal body and a tread-supporting portion extending from said outboard portion toward the inboard end, and a second frame member extending along the inboard end and having means providing for securement of said tread-supporting portion of said first frame of said member thereto, said tread comprising a body made of moldable plastic-like material and having an opening therethrough through which said tread-supporting means extends, said tread having a portion defining at least a part of the outer side of said pedal body, and means on said tread for rendering the bicycle pedal luminous consisting of luminescent paint adhered to said portion of said one tread for producing a visible signal upon light impinging thereon, said tread portion having at least one indentation therein on the outer side of said tread, said tread having a paint receiving surface for receiving said luminescent paint, said indentation having side wall portions extending from said paint receiving surface of said tread to restrain the lateral flow of said luminescent paint during application of said luminescent paint on said tread to provide a clearly defined form of said luminescent paint.

* * * * *